S. KHALIL.
MOTOR VEHICLE.
APPLICATION FILED JULY 23, 1920.
1,389,764.
Patented Sept. 6, 1921.
7 SHEETS—SHEET 3.
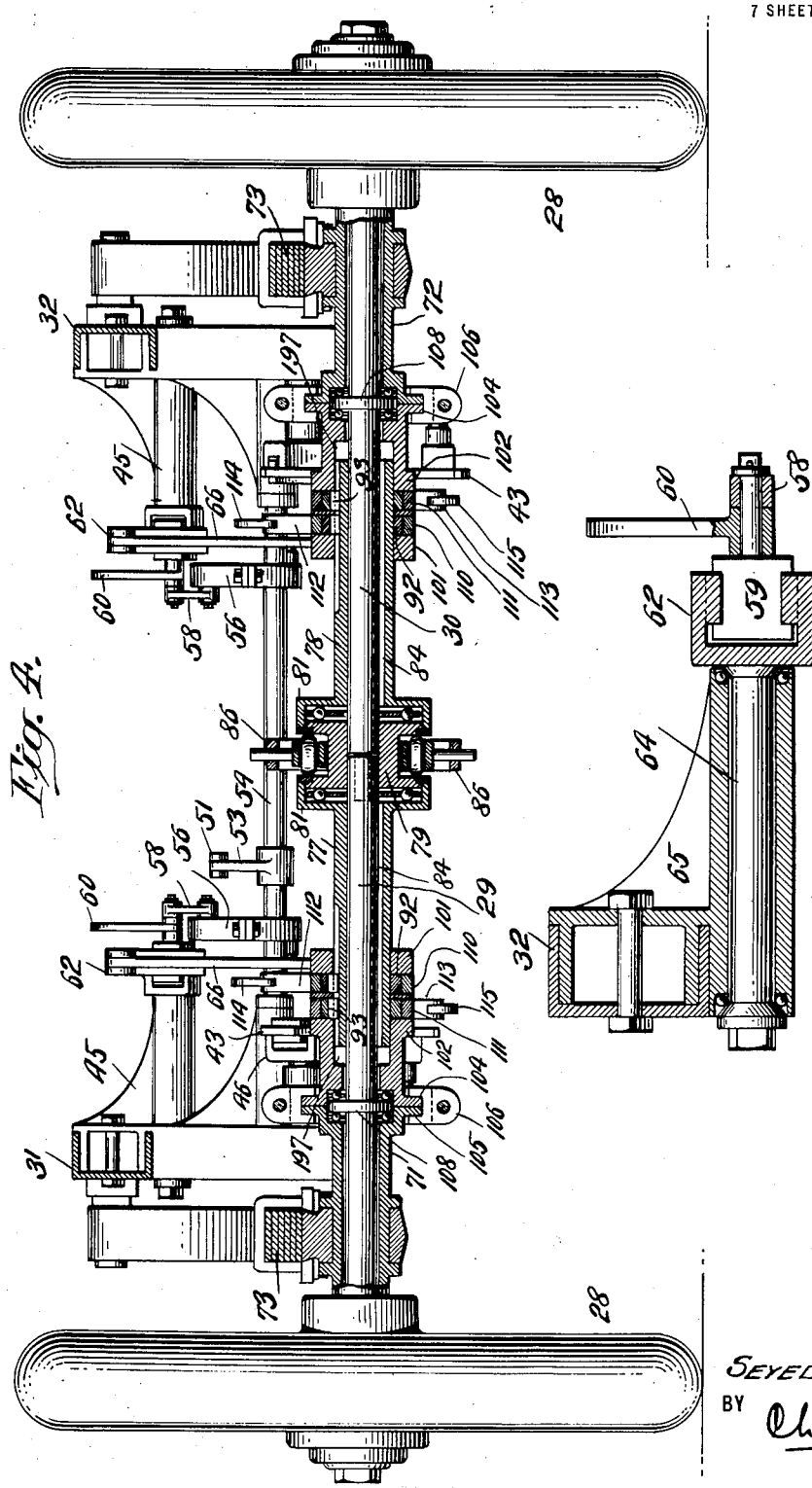
INVENTOR
SEYED KHALIL
BY
ATTORNEY

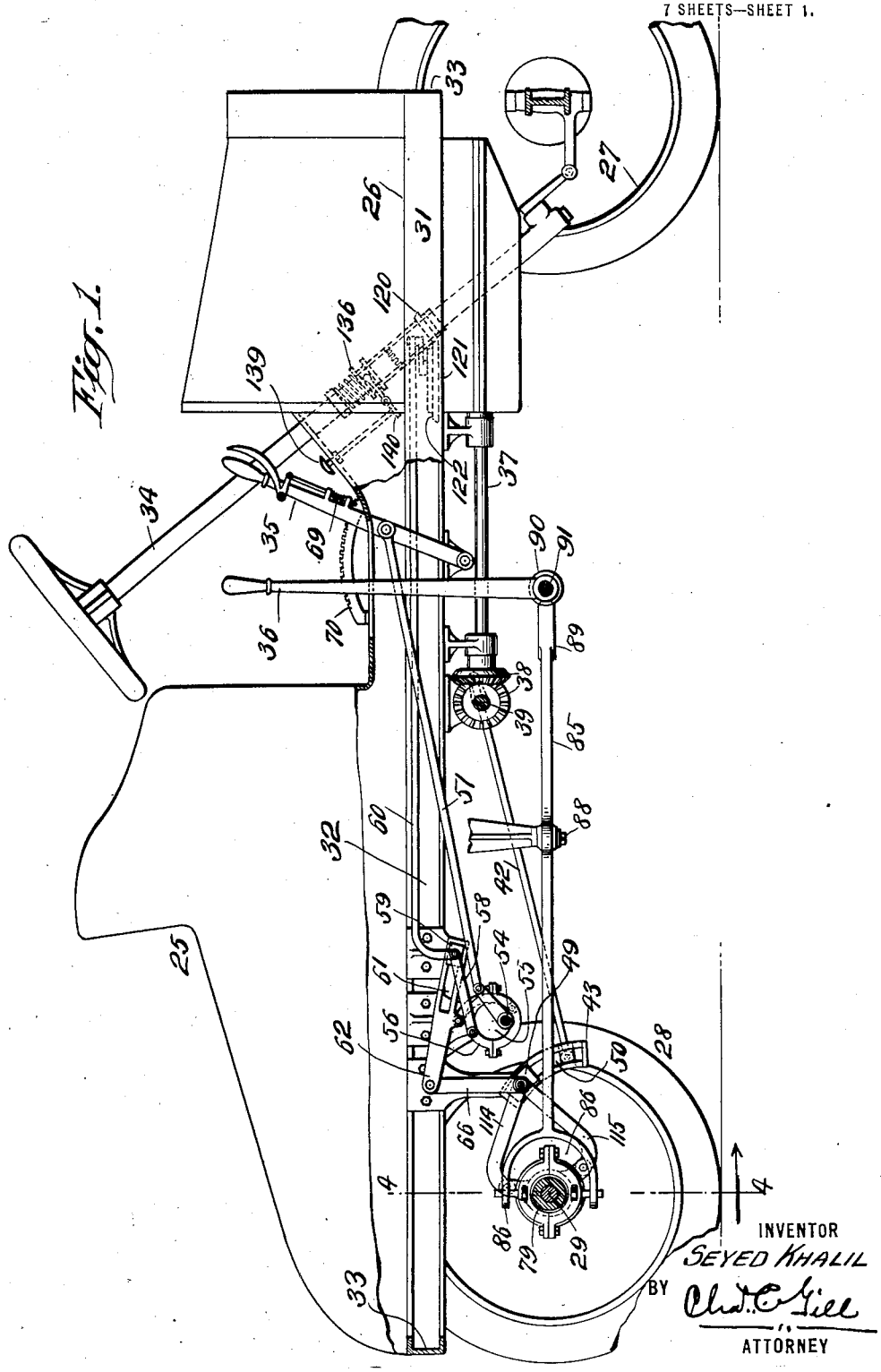

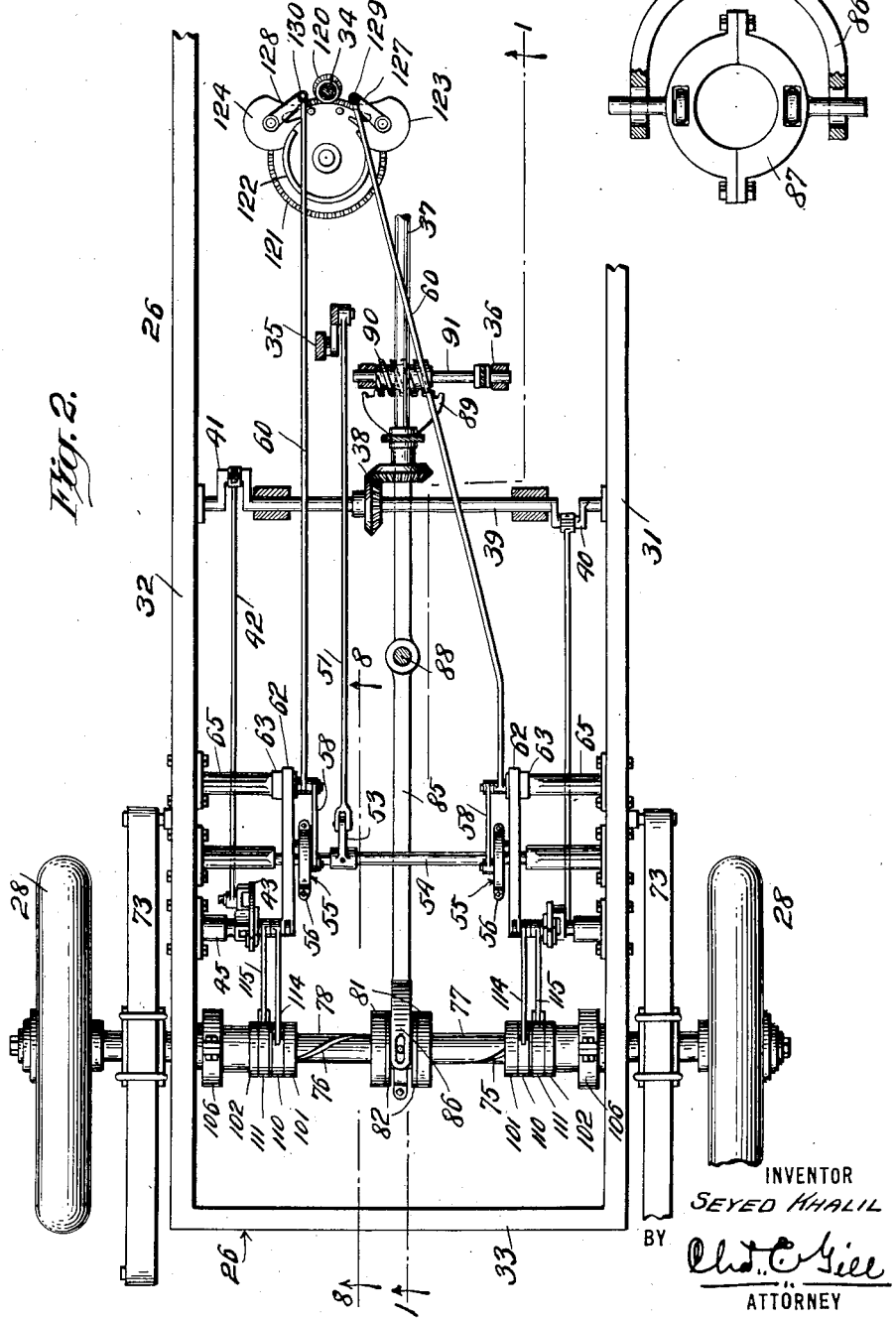

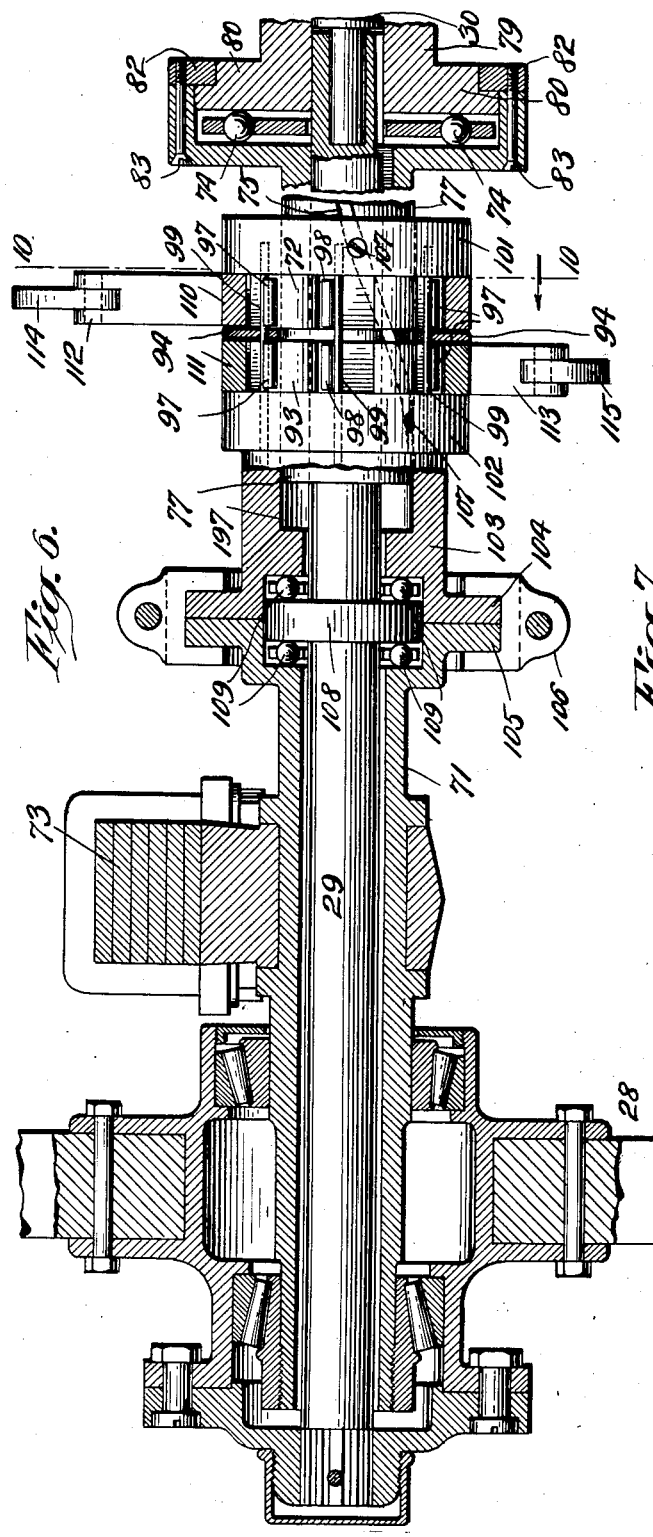

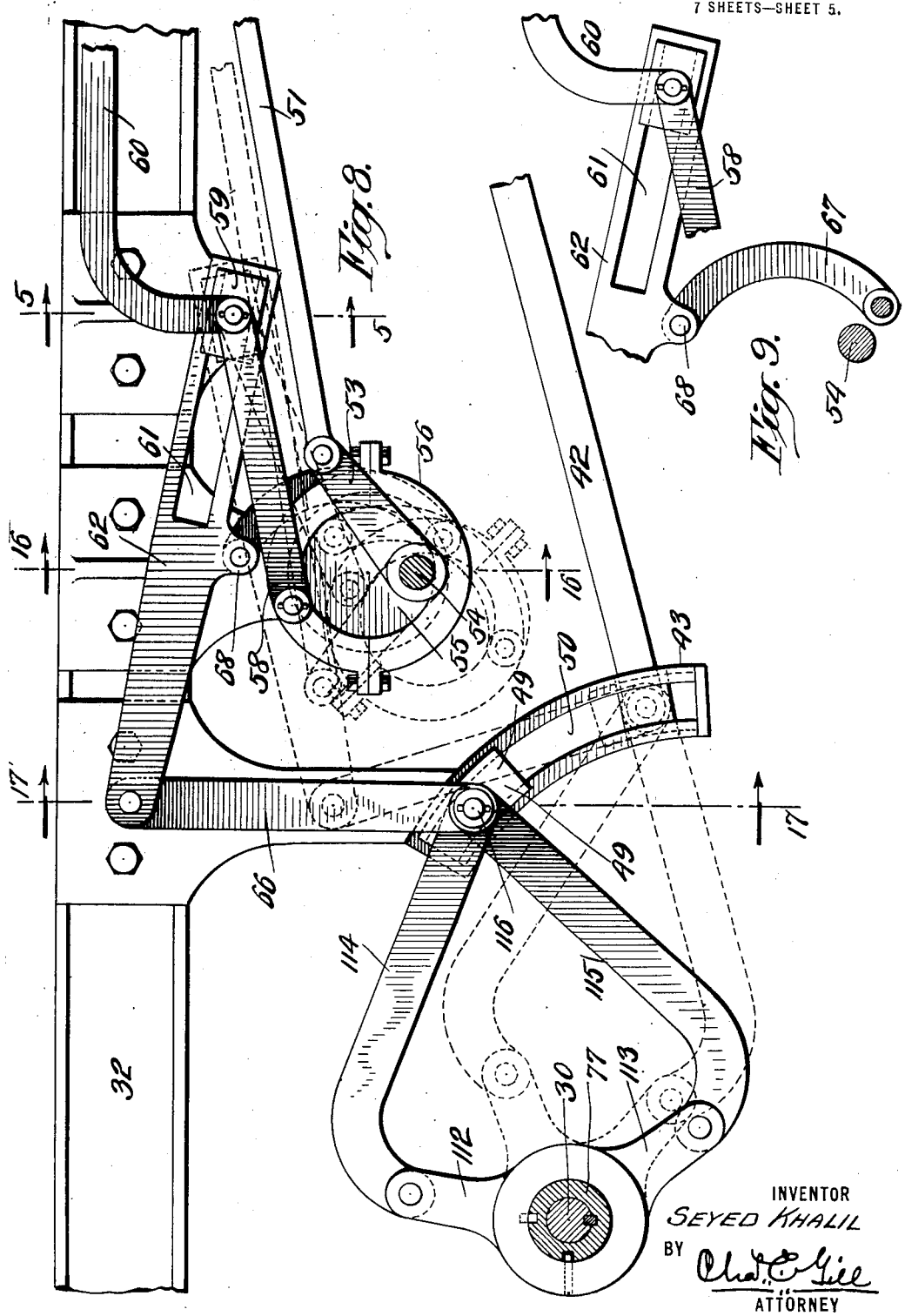

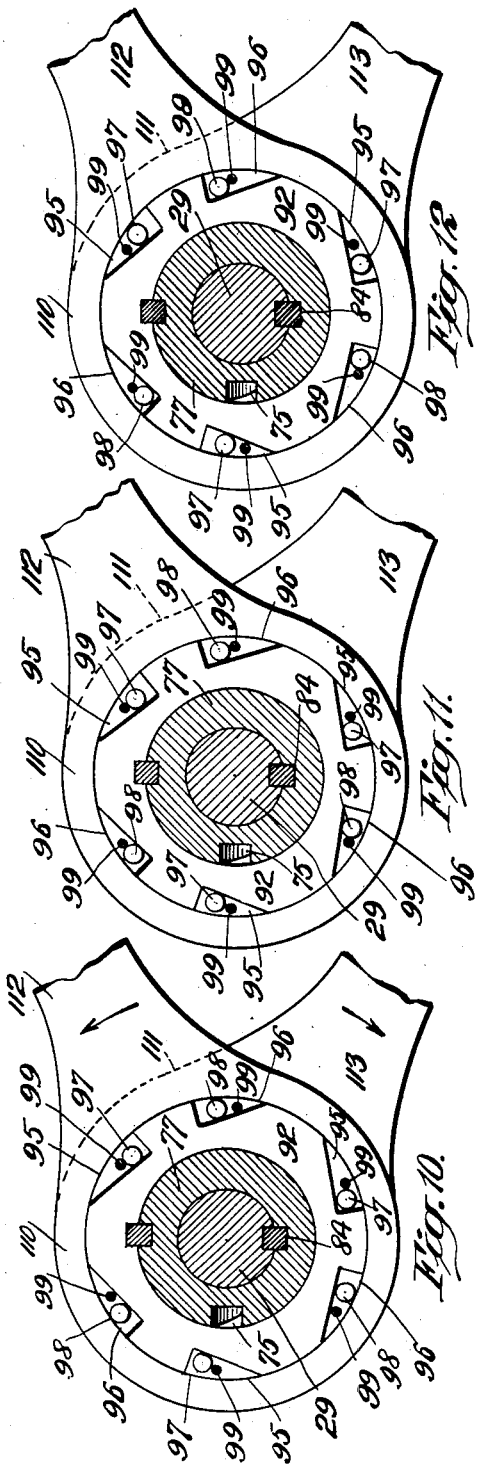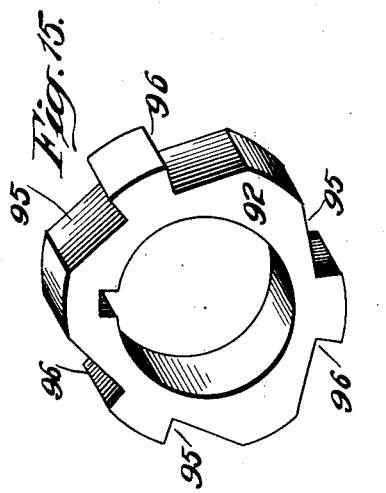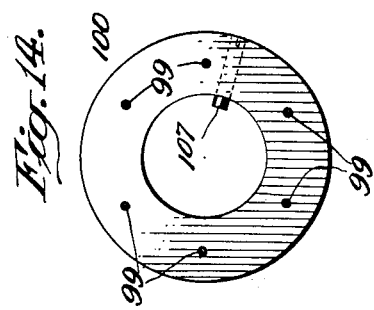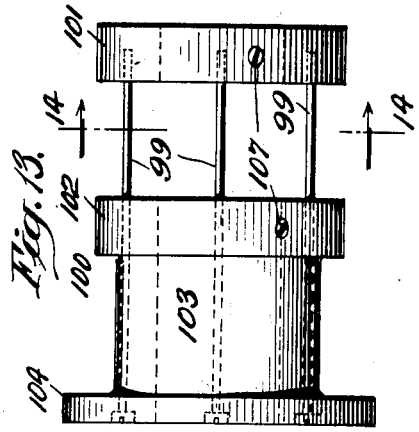

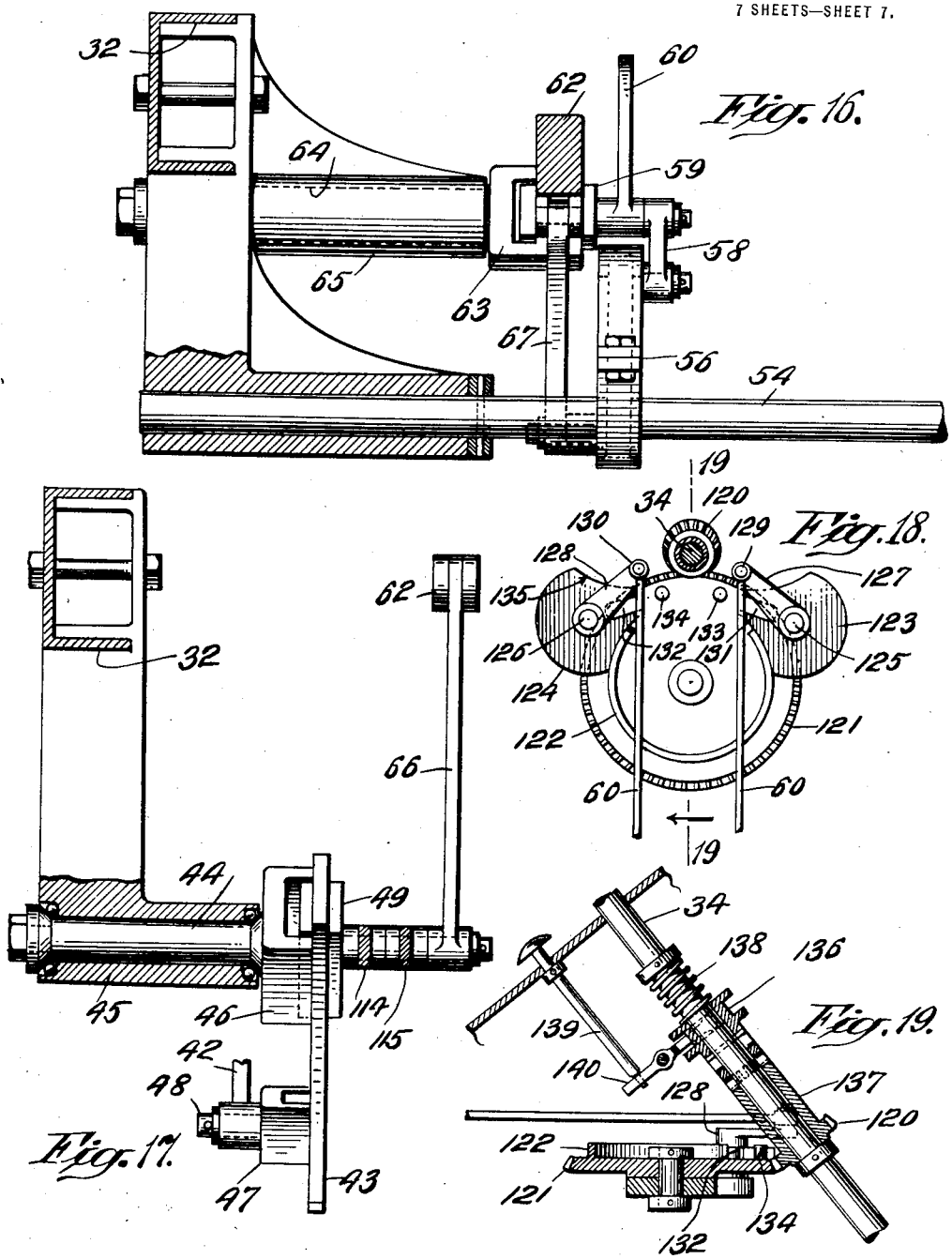

UNITED STATES PATENT OFFICE.

SEYED KHALIL, OF NEWARK, NEW JERSEY, ASSIGNOR OF FORTY-FIVE PER CENT. TO ISADOR STERN, OF NEWARK, NEW JERSEY.

MOTOR-VEHICLE.

1,389,764.     Specification of Letters Patent.     Patented Sept. 6, 1921.

Application filed July 23, 1920. Serial No. 398,475.

*To all whom it may concern:*

Be it known that I, SEYED KHALIL, a subject of the King of Persia, and a resident of Newark, in the county of Essex and State of New Jersey, have invented certain new and useful Improvements in Motor-Vehicles, of which the following is a specification.

The invention relates to improvements in motor vehicles, and it resides more particularly in novel transmission mechanism for driving the vehicle from the engine shaft, parts of said mechanism, in two sets thereof, being interposed between the driving shaft and the sections of the rear axle of the vehicle and controllable by the driver of chauffeur and other portions of said mechanism being operable by the chauffeur through the steering post and suitable levers for securing a differential movement in the rear vehicle wheels.

One object of the invention is to provide efficient means for transmitting motion to the sections of the rear axle by oscillatory means acting through suitable brake-members on said sections and said means being actuated by suitable link-motions whose action may be varied at will so as to vary the speed of the vehicle, the said brake-members on said sections of the rear axle being alternately engaged by said oscillatory means for imparting constant motion in either direction to said sections, and said sections also being equipped with means whereby they may, without necessary modification of the driving mechanism, be reversed in motion. I provide two sets of corresponding driving mechanisms, one for each section of the rear axle, and each set is under certain independent control so that when desired one rear wheel may remain at its then normal speed while the other rear wheel is reduced in speed, as when making turns, without modification of the power at the driving shaft.

My invention seeks to place under ready control the transmission mechanism of the motor vehicle and to simplify such mechanism by dispensing with much of the gearing and complications at present incident to transmission mechanisms for motor vehicles.

My invention resides in various novel features of construction, arrangement and combinations of parts, all of which will be fully understood from the detailed description hereinafter presented, reference being had to the accompanying drawings, in which:

Figure 1 is a side elevation, partly broken away and partly in section, of a motor vehicle equipped with the features of my invention, the sectional portion of Fig. 1 being taken on the dotted line 1—1 of Fig. 2;

Fig. 2 is a top view, partly broken away, of the supporting frame of the vehicle and the mechanism embracing my invention, certain details of the mechanism being shown in horizontal section;

Fig. 3 is a detached side elevation, partly in section and partly broken away, of means provided on the rear axle for reversing the direction of motion thereof;

Fig. 4 is a vertical section on a larger scale through the rear axle and associated parts, the section being taken on the dotted line 4—4 of Fig. 1;

Fig. 5 is a view on an enlarged scale and mainly in section showing one of the brackets secured to the side of the supporting frame of the vehicle and its associated parts;

Fig. 6 is a vertical longitudinal section, partly broken away, through the rear axle and one of the rear wheels of the vehicle:

Fig. 7 is a front elevation of a rotary sleeve which receives the adjoining ends of the sections of the rear axle and which, when shifted by the means shown in Fig. 3, serves to reverse the direction of motion of the rear axle without interrupting the operation of the driving mechanism;

Fig. 8 is an enlarged side elevation, partly broken away and partly in section, of the oscillatory lever means for alternately imparting rotary motion to the rear axle and the means for adjusting the parts of the link motion which drives said levers so as to modify the throw of the levers and the speed of the vehicle;

Fig. 9 is a side elevation, partly broken away and partly in section, of a portion of the mechanism shown in Fig. 8 and which is employed for adjusting the throw of the oscillatory levers whose motion is imparted through brake-members to the rear axle;

Fig. 10 is a vertical section through one rear axle section and associated parts, taken on the dotted line 10—10 of Fig. 6 and illustrating a portion of the rear axle, a portion of a slidable sleeve mounted thereon and keyed thereto, a brake member or shoe keyed on said sleeve and the sleeve portions of two oscillatory levers which alternately, when moved toward and from each other, impart motion through the intermediate features to the rear axle;

Fig. 11 is a substantially corresponding view of the same, but illustrating the brake rollers so positioned with regard to the brake shoes as to occupy a neutral position and permit of the movement of the said oscillatory levers without motion therefrom being imparted to the rear axle; in such position of the parts the eigine may be kept in operation without imparting motion to the rear axle;

Fig. 12 is a further corresponding view of the same illustrating a position of the brake rollers reverse to that shown in Fig. 10;

Figs. 10 and 12 illustrate the fact that the rear axle through the oscillatory levers and intermediate brake members may be rotated forwardly or reversely at will;

Fig. 13 is an enlarged front elevation of the means provided on the rear axle, on each section thereof, and operable from the spirally grooved sleeve shown in Fig. 7 for so setting the brake rollers, shown in Figs. 10, 11 and 12, that they may operate to assure the forward rotation of the rear axle or the rear rotation thereof or the remaining stationary of the said axle even though the driving mechanism of the vehicle may be in motion;

Fig. 14 is a vertical section through the same, taken on the dotted line 14—14 of Fig. 13;

Fig. 15 is a perspective view of one of the brake shoes encompassing the rear axle and the spirally grooved sleeve thereon for coöperation with the brake rollers and oscillatory levers shown in Figs. 10, 11 and 12;

Fig. 16 is a vertical transverse section on a larger scale through a portion of the mechanism, taken on the dotted line 16—16 of Fig. 8;

Fig. 17 is a corresponding section through a portion of the mechanism, taken on the dotted line 17—17 of Fig. 8 and illustrating a portion of the mechanism employed for adjusting the throw of the oscillatory levers more directly associated with the sections of the rear axle;

Fig. 18 is a top view on a larger scale of a portion of the mechanism shown at the right hand end of Fig. 2 and employed for reducing the speed of one of the rear wheels while the other wheel remains at its then normal running speed, this being to accomplish the duty of differential gearing and coming into use, under the control of the chauffeur, when the vehicle is making a short turn, and Fig. 19 is a vertical section through a portion of the steering post and parts associated therewith, the section being taken on the dotted line 19—19 of Fig. 18.

In the drawings, 25 denotes diagrammatically the body of a motor vehicle or automobile, 26 the supporting frame thereof of any suitable type, 27 the usual front wheels and 28 the usual rear wheels which are secured on the outer ends of the rear axle-sections 29, 30, respectively, in the customary manner shown at the left hand end of Fig. 6, or in any suitable way. The frame 26 is shown as made up from channel side beams 31, 32, respectively, and connecting ends 33, but said frame may be built up in any convenient manner.

34 designates a steering rod; 35 a hand-lever by which the driving mechanism associated with the rear axle may be rendered operative and set to secure the desired speed for the vehicle, and 36 a manually operative lever by which the mechanism at the rear axle may be set in a neutral position so that said axle may remain at rest or set to assure the forward travel of the vehicle, or set to reverse the direction of motion of the vehicle, all as hereinafter fully explained.

The usual engine shaft is designated by the numeral 37, and said shaft is connected by gears 38 with a transverse driving shaft 39 having crank members 40, 41, respectively, set at 90 degrees to each other.

The motion of the transverse shaft 39 is communicated to the sections of the rear axle by means involving my invention and which I will now describe, there being two sets of this mechanism, one for each crank member 40, 41 and for each rear axle section 29, 30.

In Fig. 8 the mechanism intermediate the crank 41 and rear axle section 30 is shown on a larger scale, and since both mechanisms are the same in construction, I will refer specifically to the features shown in Fig. 8. Upon the crank 41 is journaled the forward end of a drive rod 42, and the rear end of this rod is pivotally connected with the lower end of an oscillatory link 43 which is pivotally secured at its upper end on a pin 44 mounted in a tubular bearing 45 secured to and extending inwardly from the side frame 32, as shown in Fig. 17. The link 43 is of arcuate shape and is in the form of a slotted plate which is secured at its upper end to a block 46 secured on the inner end of the bearing pin 44 and has secured to its lower end a block 47 to which the rear end of the rod 42 is pivotally connected by means of a pin 48. The link 43 adjustably receives within its arcuate slot a saddle 49 whose position in the slot 50 of the link 43 determines the speed of the vehicle. In Fig. 8 I illustrate the saddle 49 in a neutral position or in line with the bearing pin 44 for the link 43, and when said saddle is in this position no motion will be transmitted from said link and saddle to the means for driving the rear axle. When the saddle 49 is moved to the lower end of the link 43, the rocking motion of said link will impart the maximum movement to the lever means intermediate said saddle 49 and the rear axle, and the vehicle will then have the maximum speed imparted to it. The degree of speed to be imparted to the vehicle will be governed by the adjustment of the saddle 49 along the slot 50 of the link 43, and this adjustment of said saddle is performed by the driver and the operation of the hand lever 35, in a manner which may be explained at this place. The lever 35 has a rod 51 pivotally connected with it, and the rear end of this rod is pivotally secured to a crank-arm 53 which is rigid on a transverse shaft 54. The transverse shaft 54 has mounted on it for each set of the driving mechanism an eccentric 55 which is encompassed by an eccentric band 56 which is capable of limited rotary motion on the eccentric. The band 56 has secured to it on a pin 57 the rear end of a link 58 whose forward end is pivotally connected with a saddle 59 and also with the rear end of a rod 60 which extends forwardly to certain Geneva locking mechanism shown in Fig. 18 and hereafter to be described. The saddle 59 is adjustable within a slot 61 of a lever 62 which is secured at its forward end to a block 63 mounted on a pivot-rod 64 held in a bracket bearing 65, which is secured to the side frame 32, as shown in Fig. 16. The lever arm 62 has a swinging motion from the pivot-rod 64, and this motion is communicated through a link 66 connected with the rear end of said arm 62 to the saddle 49 to which the lower end of said link 66 is connected. It will readily be understood that the movement downwardly of the rear end of the arm 62 will cause the link 66 to move the saddle 49 downwardly along the slot 50 of the link 43, and that an upward movement of the rear end of the arm 62 will cause the link 66 to raise the saddle 49, whereby the position of the saddle 49 in the link 43 may be controlled at will. The lever-arm 62 has a controllable movement and is maintained rigidly at the end of each of its movements so that when the saddle 49 becomes adjusted it may remain in such position so long as may be desired. The position of the lever arm 62 may be controlled through the rod 51, crank-arm 53, eccentric 55 and eccentric band or strap 56, in connection with the link 58 connected with one side of the band or strap 56 and a link 67 connecting the other side of said band or strap 56 with an ear 68 on about the middle portion of the lever arm 62. When by means of the rod 51, crank-arm 53 and shaft 54, the eccentric 55 is turned in one direction or the other, it will affect the position of the lever-arm 62, since, for illustration, if the shaft 54 should be turned in a direction toward the front or clockwise by a forward movement of the rod 51, said eccentric would force the band or strap 56 in a forwardly and upwardly direction, and this would effect an upward swing of the link 58 and an upward movement of the link 67, with the result of causing the rear end of the lever-arm 62 and link 66 to move upwardly and assume the neutral position in which said parts are shown in Fig. 8, the saddle 49 being drawn to the upper end of the slot 50 of the link 43. The link 58 during the operation just referred to would merely have a swinging motion from that indicated by dotted lines in Fig. 8 to that represented by solid lines in Fig. 8. Should it be desired to impart motion to the vehicle, the rod 51 would be pushed rearwardly so as to turn the shaft 54 and eccentric 55 counter clockwise or toward the rear, and this would have the effect of lowering the brake-band or strap 56 and, through the link 67, lowering the rear end of the lever arm 62, with the result of causing, through the link 66, the lowering of the saddle 49 toward the free end of the link 43. The link 58 operates as a stay to prevent any complete rotation of the eccentric band 56 and also performs a duty which will be explained hereinafter in connection with the rod 60. The lever-arm 62 has a swinging motion from the fixed pivot point 64 at its forward end, and it is raised and lowered, under ordinary conditions, from the rod 51, crank arm 53, shaft 54, eccentric 55, band 56 and link 67, the movement of the rod 51 in one direction effecting, through the link 67, the elevation of the rear end of the lever arm 62, link 66 and saddle 49, and the movement of the rod 51 in a reverse direction causing, through the features named, the lowering of the rear portion of the lever-arm 62, link 66 and saddle 49. The rod 51 may be locked in any position to which it may be moved by means of the pawl rod 69 and segmental rack 70, shown in Fig. 1, and being of known construction, whereby when the saddle 49 has been adjusted for any certain speed of the vehicle, said saddle and the parts leading thereto and therefrom may be held in fixed position.

During the usual travel of the vehicle, either forwardly or reversely, the rod 60 will remain stationary and in the relation to the lever arm 62 shown in Fig. 8, said rod 60 being movable from such position at the proper time under the control of the driver, and this taking place only when it is desired to turn a corner and impart a differential action to the rear wheels 28. There being two sets of the driving mechanism, one for each section of the rear axle, there will be two of the rods 60 each having an independent action. When the rod 60 is in the position shown in Fig. 8 with the saddle 59 at the forward end of the slot 61 in the lever arm 62, said rod 60 is not performing any duty. When, however, it is desired that the rod 60 shall have some influence on the lever arm 62 and parts connected therewith and the saddle 49 is in speed position, said rod 60 will be pushed rearwardly and its saddle 59 will then travel rearwardly along the slot 61 of said lever arm 62, with the result of tilting the rear portion of said lever arm upwardly and moving the saddle 49 upwardly, as far as may be necessary, to a proper position, while at the same time the corresponding rod 60 for the other rear axle section will remain stationary, the result being that the axle section affected by the rearward movement of the rod 60 would have a reduced speed imparted to it, while the axle section more directly associated with the other rod 60, said other rod being left at rest, would be left on normal speed and thereby one rear wheel would have its normal speed motion and the other a slower speed motion or no motion at all, all this taking place when it should be desired to turn a corner and carrying out the usual duties of differential gearing, as will be hereinafter referred to. At the present place it was intended more particularly to describe the rod 51 and parts leading therefrom for the adjustment of the saddle 49 in the link 43 with respect to the usual travel forwardly or backwardly of the vehicle. The link 43, as has been described, has an oscillatory motion imparted to it through the rod 42 and crank-shaft 39, and this movement of the link 43 is depended on to actuate the rear axle section 30, corresponding means being provided for the simultaneous actuation of the other rear axle section 29.

Upon the rear axle section 30 I provide a set of mechanism which is identically the same as a set of mechanism I provide on the rear axle section 29 and which is fully illustrated in Figs. 6 and 7 and Figs. 10 to 15 inclusive, and in respect to the rear axle sections 29, 30 I may say that they correspond with each other and are mounted within hollow tubular frames 71, 72, respectively, which support the roller bearings for the wheels 28 and also the vehicle springs 73.

Upon the adjoining end portions of the axle sections 29, 30 are mounted tubular sleeves 77, 78 which correspond with each other and are formed with spiral grooves 75, 76, respectively, said sleeves or sleeve sections 77, 78 being connected together by a hub 79 whose end portions 80 are of general disk outline and fit within cupped flanges 81 on the sleeve sections 77, 78 as illustrated in Figs. 4 and 6. The disks 80 are recessed out at their outer facing edges to receive rings 82, and these rings face against the rims of the cupped flanges 81 on the sleeve sections 77, 78 and are secured thereto by bolts or screws 83, whereby the hub 79 and sleeve sections 77, 78 become connected together. The sleeve sections 77, 78 are secured by keys 84 to the axle sections 29, 30, and said sleeve sections are slidable to a limited extent upon the axle sections, this being for the purpose, as will be explained in detail hereinafter, of effecting a reversal of the direction of travel of the vehicle, this direction of travel of the vehicle being under the control of the driver from the hand lever 36, whose actuation in one direction or the other will effect at the hub 79 the sliding action in one direction or the other of the sleeve sections 77, 78. The lever 36 is practically a shipper lever and acts through the pivoted rod 85 to swing the fork 86 and pivoted band 87 in one direction or the other against the facing portions of the hub 79, thereby serving to shift the sleeve sections 77, 78 in one direction or the other on the axle sections 29, 30. The rod 85 is secured on a vertical pivot 88 and has at its forward end a toothed segment 89 which is engaged by a worm 90 mounted on a rod 91 to which the lower end of the lever 36 is connected. As the lever is pushed forwardly or pulled backwardly at its upper end, the worm 90 will act upon the segment 89 and swing the rod 85 in one direction or the other, with the result of shifting the sleeve sections 77, 78. Any suitable shipper means may, however, be provided for shifting the hub 79 and sleeve sections 77, 78. The hub 79 is hollow and receives the adjoining ends of the axle sections 29, 30, as shown in Figs. 4 and 6, the inner end of the axle section 29 preferably having a socket to freely receive a dowel end portion of the axle section 30, as shown in Fig. 6. The hub 79 while slidable with the sleeve sections 77, 78 does not rotate therewith, the rings 82 being freely held in their bearing recesses, and hence between the disk-ends of said hub and the adjacent portions of the cupped flanges, 81 I provide thrust bearings 74.

At opposite sides of the hub 79 I provide on the respective sleeve sections 77, 78, two corresponding brake shoe wheels or members 92, 93 which are spaced apart by a washer 94 and keyed on the sleeve sections 77, 78, as shown in Figs. 10, 11, 12, so as to be capable of rotating said sleeve sections and through the same the axle sections 29, 30. The brake shoes or members 92, 93 have no sliding movement but permit the sleeve sections 77, 78, to have a limited sliding movement through them when actuated from the hub 79.

Each brake shoe or member 92, 93 has two sets of reversely disposed alternate recesses 95, 96 which have inclined bottom surfaces and are deeper at one end, as shown in Figs. 10, 11, 12 and 15, and within said recesses are arranged brake-rollers 97, 98, respectively, whose position in said recesses determines whether the rear axle sections 29, 30 shall rotate at all and also the direction of rotation of said axle sections.

Within the recesses 95, 96 of the brake-shoes or members 92, 93 and crossing the same between the brake-rollers therein and the shallower ends of said recesses are pins 99 which are employed to position said brake rollers and are carried by frames 100 which are capable of rotary motion and one of which is shown in detail in Figs. 13 and 14. The frames 100 are mounted on the sleeve sections 77, 78 and receive their rotary motion therefrom, and each frame 100 is composed of two spaced apart collars 101, 102 connected by and carrying the pins 99, a hub 103 integral with the collar 102 and a flange 104 on the outer end of the hub 103. The pins 99 are formed of screws extending through the hub 103, as indicated in Fig. 13. The flanges 104 match similar flanges 105 on the respective stationary frames 71, 72 and are loosely held against the same by box-straps 106. The collars 101, 102 carry pins 107 which enter the spiral grooves 75, 76 of the sleeve sections 77, 78 and by reason thereof are not only caused to rotate with said sleeve sections but have a partial independent rotation when said sleeve sections are slid on the axle sections 29, 30 from the hub 79. The sliding movement of the sleeve sections 77, 78 causes the spiral grooves 75, 76 to move against the pins 107 and turn the frames 100, with the result that the cross pins 99 are moved with relation to and position the brake-rollers 97, 98 for the work they are to perform or to remain inactive, this last position being shown in Fig. 11. When the vehicle is to travel forwardly, the sleeve sections 77, 78 will be slid to turn the frames 100 for positioning the pins 99 with relation to the rollers 97, 98, as shown in Fig. 10, and when the vehicle is to travel rearwardly the sleeve sections 77, 78 will be slid to turn the frames 100 in a reverse direction so as to cause the pins 99 to give the rollers 97, 98 the position in which they are shown in Fig. 12. The sliding of the sleeve sections 77, 78 is under the control of the driver and hence he may effect such rotation of the frames 100 as will result in the pins 99 positioning the rollers 97, 98 in a manner to meet his requirements.

The hubs 103 of the frames 100 are chamfered, as at 197, to admit of the sliding movement of the sleeve sections 77, 78. The axle sections 29, 30 are prevented from having sliding movement by means of collars 108 thereon held between the adjacent sections of the stationary frames 71, 72 and frames 100, as shown in Fig. 6, ball bearings 109 being provided between said collars 108 and the adjacent surfaces of the frames 71, 72 and frames 100.

Upon the brake shoes or members 92, 93 and confined between the collars 101 and 102 are located oscillatory or partial rotary sleeves 110, 111, both sleeves being alike and their construction being illustrated in Figs. 6, 10, 11 and 12. The sleeves 110, 111 are in the form of rigid bands closely engaging the peripheral surfaces of the brake shoe or members 92, 93 and each has an outwardly projecting or radial arm, the arms on the sleeves 110 being numbered 112 and the arms on the sleeves 111 being numbered 113. The arms 112, 113 have an oscillatory motion toward and from each other imparted to them from oscillatory arms or links 114, 115, respectively, whose rear ends are pivotally connected with said arms 112, 113, as shown in Fig. 8, and whose forward ends are brought together and secured on pivot pins 116 carried by the saddles 49. There are two of the sleeves 110, 111 at each side of the hub 79 to coöperate with the two pairs of brake-shoes or members 92, 93, and the arms 114, 115 connected to the arms 112, 113 of one pair of said sleeves 110, 111 are connected with the pivot-pin 116 carried by the saddle 49 of one set of the driving mechanism, while the corresponding arms 114, 115 for the other pair of sleeves 110, 111 are connected to the pivot pin 116 carried by the saddle 49 of the other set of driving mechanism, these sets of driving mechanisms being at opposite sides of the longitudinal center of the vehicle frame, as shown in Fig. 2.

During the oscillation of the links 43 from the rods 42 connected with the crank-shaft 39, the two pairs of arms 114, 115 are alternately pushed rearwardly and drawn forwardly, closing toward each other at their rear portions when drawn forwardly and spreading outwardly from each other when pushed rearwardly, as will be understood on reference to Fig. 8, and during the rearward movement of the arms 114, 115 they turn the arms 112, 113 rearwardly in a direction from each other, while during the forward movements of said arms 114, 115 they pull the arms 112, 113 forwardly and in a direction toward each other. The movements of the arms 112, 113, just described, cause reverse oscillation or partial rotary movements of the sleeves 110, 111 with which said arms 112, 113 are connected, and these movements of the sleeves 110, 111 are depended upon, in coöperation with the brake-members hereinbefore referred to, and the sleeve-members 77, 78 for rotating the axle sections 29, 30 either to drive the vehicle forwardly or rearwardly, as occasion may require and as the brake-rollers 97, 98 may be positioned in the recesses of the brake-shoes 92, 93. On reference to Fig. 10 it may be understood that when the arm 112 and sleeve 110 are turned counter-clockwise by a rearward push of the arm 114, the sleeve 110 will idly slip around the brake-shoe 92, because at that time said sleeve 110 is turning toward the deeper ends of the recesses 96 in said brake-shoe and has no effect on the brake rollers 98 in said recesses. At the same time the arm 113 and sleeve 111 will be turned clockwise by the rearward drive of the arm or link 115 and at such time the sleeve 111 will be turned toward the shallower ends of the recesses 96 in its brake-shoe 93 and cause the rollers 98 in said recesses to wedge between the bottoms of said recesses and said sleeve 111 with the result of binding the sleeve 111 to the brake-shoe 93 and causing said brake-shoe to rotate the sleeve member 77, or 78, as the case may be, and impart rotary motion through said sleeve member 77 or 78 to the rear axle section 29 or 30, according to which side of the driving mechanism may be under consideration. In the illustration shown in Fig. 10, the motion of the sleeve 111 is communicated to the brake-shoe 93 and through said shoe to the sleeve section 77 and rear axle section 29. With regard to Fig. 10 therefore when the arm 112 and sleeve 110 are turned counter-clockwise, they perform no duty, while at the same time the arm 112 and sleeve 111 are turned clockwise and impart rotation to the brake-shoe 93, sleeve section 77 and rear axle section 29, causing the vehicle to travel forwardly. On the return movement of the arms 112, 113 toward the front and toward each other, the arm 113 and sleeve 111 will move idly, since at that time the sleeve 111 will be traveling toward the deeper ends of the recesses 96 of the brake-shoe 93 and have no effect on the brake-rollers 98, the arm 113 and sleeve 111 then turning counter-clockwise. During this movement of the arm 113 and sleeve 111 counter-clockwise, the forward turning of the arm 112 and sleeve 110 clockwise, results in said sleeve 110 moving toward the shallower ends of the recesses 96 in the brake-shoe 92 and in causing the brake-rollers 98 to become bound between said sleeve 110 and said brake-shoe and in effecting the rotation of said brake-shoe, the sleeve sections 77 and axle section 29.

During the oscillatory movements of the links 43 and arms or links 114, 115, the sleeves 110 and 111 perform reverse oscillatory or partial rotary movements, and said sleeves alternately act through their respective brake-shoes and brake-rollers to rotate the axle sections 29, 30, the sleeves 110 moving idly in one direction while at the same time the sleeves 111 are active on moving in the reverse direction, and the sleeves 110 being active on moving in one direction while at the same time the sleeves 111 are moving inactively. The sleeves 110 on one movement thereof are therefore idle and on the reverse movement thereof effect the rotation of the axle sections 29, 30, and the sleeves 111 move idly in one direction while in the reverse direction said sleeves impart rotary motion to the axle sections 29, 30. A continuous rotation of the axle sections 29, 30 is secured by having first the sleeves 110 and then the sleeves 111 act to rotate said axle sections. The vehicle will have a forward motion under the action of the links 43, arms 114, 115, arms 112, 113 and sleeves 110, 111 when the pins 99 carried by the frames 100 are in the relation to the brake-rollers 97, 98 shown in Fig. 10. When it is desired to reverse the direction of travel of the vehicle, the driver by means of the hand lever 36 and shipper lever 85 will slide the sleeve sections 77, 78 in a direction to cause the grooves 75, 76 therein to ride against the pins 107 carried by the said frames 100 and turn said frames 100 so that the pins 99 instead of being in the position shown in Fig. 10 will be shifted to the position shown in Fig. 12, said frames 100 then being turned counterclockwise so as to recede the pins 99 from the rollers 97 in the recesses 95 of the brake shoes and cause said pins to approach and move against the rollers 98 in the recesses 96, moving said rollers 98 into the deeper ends of said recesses. Under this condition the movement of the arms 112 and sleeves 110 will act when turned counter-clockwise to bind the rollers 97 between the sleeves 110 and brake-shoes and effect a reverse rotation of the axle sections 29, 30, while at the same time when the arms 113 and sleeves 111 are turning clockwise, they will move idly over the rollers 97 in the recesses 95. On the return or clockwise movement of the arms 112 and sleeves 110 said sleeves will move the rollers 97 toward the deeper ends of the recesses 95 and have no effect on the brake-shoes 92 or axle sections 29, 30, while at the same time the arms 113 and sleeves 111 while turning counter-clockwise will engage the rollers 97 with the brake-shoes 93 and effect a reverse rotation of said shoes and the axle sections 29, 30. To effect the forward travel of the vehicle the arms 112 and sleeves 110 move idly when turning counterclockwise and effect the rotation of the axle sections when moving clockwise, and the arms 113 and sleeves 111 move idly when turning clockwise and effect the rotation of the axle sections when turning counterclockwise. On the shifting of the sleeve sections 77, 78, and rotation of the frames 100 to carry the pins 99 to the position shown in Fig. 12, whereby to secure the reversal of the direction of motion of the vehicle, the arms 112 and sleeves 110 effect the rotation of the axle sections 29, 30, when moving counterclockwise and the arms 113 and sleeves 111 effect the rotation of the axle sections 29, 30 when moving counter-clockwise.

The sleeve sections 77, 78 are provided for the purpose of positioning the brake-rollers 97, 98 through the medium of the frames 100, and in the present instance said sleeve section being keyed to the brake-shoes 92, 93, axle sections 29, 30 afford a means for communicating motion from the sleeves 110, 111 to said axle sections.

When it is desired that the axle sections 29, 30 shall not have any movement imparted to them from the sleeves 110, 111, although said sleeves may be in motion, due to the running of the engine, the sleeve sections 77, 78 will be shifted to a sufficient extent to cause the rotary frames 100 to carry the pins 99 against the brake-rollers 97, 98, and move all of said rollers into the deeper portions of the recesses 95, 96 of the brake-shoes, as shown in Fig. 11, in which it may be seen that the pins 99 confine the rollers 97, 98 in the deeper ends of the brake-shoe recesses where said rollers are compelled to remain idle and not act as binders between the sleeves 110, 111 and their respective brake-shoes.

The extent of movement the sleeves 110, 111 shall impart to the axle sections 29, 30 will be governed by the extent of their throw through the links 43, arms 114, 115, and arms 112, 113, and as will largely be understood from the description hereinbefore presented the throw of the arms 114, 115 and arms 112, 113 may be regulated by the adjustment of the saddles 49 in the links 43, said arms 112, 113 receiving practically no movement when the saddles 49 are at the upper ends of the links 43 or in neutral position, shown in Fig. 8, and receiving their maximum movement when said saddles 49 are at the lower ends of the links 43. Intermediate speeds for the vehicle may be had by the adjustment of the saddles 49 at points along the slots 50 between the ends of the links 43. I believe the method of adjusting the position of the saddles 49 will be understood from the description hereinbefore presented, this adjustment usually taking place through the rod 51, shaft 54, eccentrics 55, links 67, lever arms 62 and links 66, the latter being connected at their lower ends with said saddles 49.

When the vehicle is to turn a corner there should be a differential action of the axle sections 29, 30, and at this time the driver will turn the steering post 34 for setting the usual front axles and at the same time this action of the steering post 34 will operate through a beveled gear wheel 120 to rotate a gear wheel 121 and effect through one of the rods 60 a rearward movement of the saddle 59 and link 58 connected therewith and an upward movement of the rear end of the associated lever arm 62 for the purpose of drawing the saddle 49 associated with said lever arm 62 upwardly or toward the upper end of the link 43, whereby without change in the power shaft 54, the action of the link on its axle section becomes lessened and the wheel taking the short turn will have a slower rotation, while the wheel at the other side of the vehicle, making the long turn, will remain at normal speed. That rod 60 will be actuated which will produce the slower movement of the rear wheel taking the shorter turn. In looking at Fig. 2 the rod 60 adjacent to the side frame 32 would be driven rearwardly, if the wheel 28 at the other side 31 of the vehicle is to make the long turn, and if the reverse should be the case, to-wit, that the wheel 28 at the side 31 of the vehicle frame should be called upon to make the short turn, the rod 60 adjacent to the side 31 of the vehicle frame would be driven rearwardly to secure the reduced movement of said wheel 28, while the wheel 28 at the side 32 of the vehicle frame would simply have its normal speed. When one rod 60 is driven rearwardly it is necessary that the other rod 60 should be locked against movement, and hence on the gear wheel 121 I provide a raised flange 122 defining a portion of a circle, and this flange coöperates with two locking cams 123, 124, respectively, which are mounted on vertical pins 125, 126, respectively, upon which are secured crank arms 127, 128, respectively, carrying pins 129, 130, respectively, on which the forward ends of the rods 60 are secured. The cams 123, 124 are recessed, as at 131, 132, respectively, and the gear 121 carries pins 133, 134, to engage said recesses. When the wheel 121 is turned in one direction or counter-clockwise, looking at Fig. 18, the pin 134 will enter the recess 132 of the cam 124 and cause said cam to turn the crank-arm 128 clockwise and drive its rod 60 rearwardly, while at the same time the recess 131 of the cam 133 will remain idle due to the fact that the rim 122 carried by said gear wheel is riding against the inner arc edge of said cam 123. The movement of the rim or flange 122 is counterclockwise, and hence toward the cam 123 and away from the cam 124, and this permits the pin 134 to enter the recess 132 and turn the cam 124 and crank arm 128 so that said arm may drive its rod 60 rearwardly and as the wheel 121 continues in motion counterclockwise, the flange or rim 122 will engage an arc surface 135 of the cam 124 and lock said cam, with its associated rod 60 and parts connected therewith, in fixed position. When the gear wheel 121 is turned clockwise, the cam 123 and its arm 127 will be actuated from the pin 133 to drive the rod 60 connected with the crank arm 127 rearwardly. When one rod 60 is driven rearwardly, the other rod 60 is in locked position, and after either rod 60 is driven rearwardly it becomes locked. The cams 123, 124 and rim or flange 122 form in effect a Geneva movement of known character, whose operation will be understood without further minute description.

The steering post 34 may be operated independently of the Geneva movement mechanism shown in Fig. 18, if desired, and to this end I provide on the post 34 a slidable clutch member 136 and form the gear wheel 120 on the lower end of a sleeve 137 whose upper end is toothed to engage the lower end of the clutch member 136. Above the clutch member 136 is a spiral spring 138 which normally keeps the member 136 in engagement with the sleeve 137. When I desire to operate the post 34 and not actuate the gear wheel 120 and parts connected therewith, I press a foot-pedal 139 to cause the lever arm 140 to lift the clutch member 136 from the upper end of the sleeve 137, as will readily be understood on reference to Fig. 19, thereby freeing the gear wheel 120 from the rod 34 and permitting said rod to be turned at will without having any effect on the gear wheels 120, 121.

The construction and operation of the mechanism embracing my invention will be largely understood from the foregoing detailed description without further extended explanation.

As a summary, however, I may say that the mechanism of my invention is substantially duplicated for each rear axle section, and that for driving purposes said mechanisms may operate in unison so that the vehicle may have proper forward and backward motion. One set of the mechanism is adjacent to the side frame 32 of the vehicle and comprises the mechanism shown more clearly in Fig. 8 and consisting of the reciprocating rod 42, link 43, saddle 49, arms 114, 115, arms 112, 113 connected therewith, sleeves 110, 111 integral with said arms 112, 113, brake shoe members 92, 93 within said sleeves, brake rollers 97, 98, tubular sleeve section 78 and frame 100 for positioning said brake rollers, the mechanism just specified being supplemented by the transverse shaft 54, operating rod 51 connected therewith, eccentric 55 on said shaft, eccentric strap 56, pivoted lever 62 connected by a link 66 with the aforesaid saddle, link 67 connecting one side of said strap to said lever 62, link 58 connecting the other side of said strap to an adjustable saddle 59 carried by said lever 62 and operating rod 60 connected with said saddle 59. The position of the saddle 49 may be adjusted at will to vary the throw of the link 43 and consequently the speed of the vehicle from the rod 51, eccentric 55, lever 62 and link 66, and when a differential motion is desired in the rear wheels, the rod 60 may be operated to modify, through the link 58, eccentric strap 56, lever 62 and link 66, the position of the saddle 49 in the link 43. The mechanism identified in detail as being adjacent to one side of the vehicle frame is duplicated at the opposite side of the vehicle. as shown in Fig. 2, the two sets of mechanism being the same and both sets of mechanism having identical operation from the shaft 39, with the exception of the setting of the saddles 49 to secure a differential movement, this result being performed by either one rod 60 or the other rod 60, as occasion may require, the rod 60 not operated being locked against movement during the differential action of the rear wheels.

The reversal of motion in the vehicle is accomplished by the driver merely by the shifting of the hub 79 and sleeve sections 77, 78, these sleeve sections coöperating with the frames 100 to position the brake-roller 97, 98 to the relation shown in Fig. 12 so that the sleeves 110, 111 acting therewith may drive the vehicle rearwardly.

The mechanism may also be continued in motion from the engine without affecting the rear axle sections by the driver shifting the hub 79 and sleeve-sections 77, 78 for the purpose of causing the frames 100 to locate all of the brake rollers 97, 98 in the deeper ends of the recesses in the brake shoes 92, 93 or to the position shown in Fig. 11, in which position of the said brake rollers the sleeves 110, 111 may move idly. The same result may be attained by the driver moving the saddles 49 to the upper or pivot ends of the links 43, in which position of said saddles the oscillation of the links 43 will have no effect on the arms 114, 115 and sleeves 110, 111. Should it be desired to check the movement of the vehicle when traveling under its own momentum after the power has been cut off from the shaft 39, the driver may, by means of the hand lever 36 and mechanism operable therefrom, shift the sleeve sections 77, 78 to cause the frames 100 to position the brake-rollers 97, 98 on reverse position, said brake-rollers and their coöperating parts then serving as a brake to prevent the forward movement of the vehicle. If the vehicle should be moving rearwardly under its own momentum, with the power of the engine cut off, the vehicle may be stopped by the driver then operating the hand lever 36 to position the brake-rollers 97, 98 in the relation shown in Fig. 10 for forward movement.

The sleeves 110 and 111 respectively coöperate with the brake-rollers 98 of the respective brake-shoes or members 92, 93 when the vehicle is to travel forwardly and with the brake-rollers 97 of said respective brake-shoes or members when the vehicle is to move backwardly and turn idly over all said rollers when no motion is to be imparted to the rear axle sections.

I do not limit my invention to all the details of form, arrangement and construction hereinbefore specifically described, since I am aware that such details may be modified in many ways without departure from my invention, which I desire to claim broadly.

What I claim as my invention and desire to secure by Letters-Patent, is—

1. In a motor-driven vehicle having an engine shaft, a main supporting frame, front and rear wheels, a rear axle in sections for said rear wheels and a steering rod, in combination, for each axle section, an oscillatory link having an adjustable saddle, means for oscillating said link from the engine shaft, means for positioning said saddle along said link to vary the speed of the vehicle, oppositely disposed links pivotally connected at their forward ends with said saddle, sleeves on the rear axle section respectively pivotally connected with the rear ends of said links and adapted for reverse oscillatory rotation therefrom, means for alternately engaging said sleeves with the axle-section for rotating the same, manually operative means for setting said engaging means to cause the movement of said sleeves to rotate said axle-section in either direction to vary the direction of travel of the vehicle, and means for adjusting said saddle to cause said link to impart a differential motion to the axle section when desired.

2. In a motor-driven vehicle having an engine shaft, a main supporting frame, front and rear wheels, a rear axle in sections for said rear wheels and a steering rod, in combination, for each axle section, an oscillatory link having an adjustable saddle, means for oscillating said link from the engine shaft, means for positioning said saddle along said links to vary the speed of the vehicle, oppositely disposed links pivotally connected at their forward ends with said saddle, sleeves on the rear axle section respectively pivotally connected with the rear ends of said links and adapted for reverse oscillatory rotation therefrom, means for alternately engaging said sleeves with the axle-section for rotating the same, manually operative means for setting said engaging means to cause the movement of said sleeves to rotate said axle-section in either direction to vary the direction of travel of the vehicle, and means for adjusting said saddle to cause said link to impart a differential motion to the axle section when desired, the means for positioning said saddle comprising a rotary eccentric, manually operative means for setting the same, an eccentric band on said eccentric, a pivoted lever arm connected at its free end with said saddle, a link connecting one side of said band with said lever arm for tilting said arm on the movement of said eccentric, and a stay-link connected with the other side of said band for restraining the band against undue movement during the setting of the eccentric.

3. In a motor-driven vehicle having an engine shaft, a main supporting frame, front and rear wheels, a rear axle in sections for said rear wheels and a steering rod, in combination, for each axle section, an oscillatory link having an adjustable saddle, means for oscillating said link from the engine shaft, means for positioning said saddle along said link to vary the speed of the vehicle, oppositely disposed links pivotally connected at their forward ends with said saddle, sleeves on the rear axle section respectively pivotally connected with the rear ends of said links and adapted for reverse oscillatory rotation therefrom, means for alternately engaging said sleeves with the axle-section for rotating the same, manually operative means for setting said engaging means to cause the movement of said sleeves to rotate said axle-section in either direction to vary the direction of travel of the vehicle, and means for adjusting said saddle to cause said link to impart a differential motion to the axle section when desired, the means for positioning said saddle comprising a rotary eccentric, manually operative means for setting the same, an eccentric band on said eccentric, a pivoted lever arm connected at its free end with said saddle, a link connecting one side of said band with said lever arm for tilting said arm on the movement of said eccentric, and a stay-link connected with the other side of said band for restraining the band against undue movement during the setting of the eccentric, and said means for causing said axle section to have a differential comprising a manually operative rod, a saddle slidable on said lever arm and to which said rod is connected, and means connecting said stay-link with said saddle and rod, whereby when said rod is moved it may act through said stay-link to turn the eccentric band and cause the other link connected therewith to tilt the rear end of said lever arm upwardly and position the saddle of said oscillatory link toward the pivot-end thereof.

4. In a motor-driven vehicle having an engine shaft, a main supporting frame, front and rear wheels, a rear axle in sections for said rear wheels and a steering rod, in combination, for each axle section, an oscillatory link having an adjustable saddle, means for oscillating said link from the engine shaft, means for positioning said saddle along said link to vary the speed of the vehicle, oppositely disposed links pivotally connected at their forward ends with said saddle, sleeves on the rear axle-section respectively pivotally connected with the rear ends of said links and adapted for reverse oscillatory rotation therefrom, means for alternately engaging said sleeves with the axle-section for rotating the same, manually operative means for setting said engaging means to cause the movement of said sleeves to rotate said axle-section in either direction to vary the direction of travel of the vehicle, and means for adjusting said saddle to cause said link to impart a differential motion to the axle section when desired, the means for alternately engaging said sleeves with the axle-section comprising brake-shoes connected with the axle-section and having reversely disposed inclined recesses in their periphery, and brake-rollers in said recesses to be engaged by said sleeves on their alternate movements and adapted to bind the sleeves and said shoes together to compel the rotation of the axle-section, and the said setting means being adapted for positioning said rollers in said recesses so that some thereof will be operative when the axle-section is to rotate in one direction and others will be operative when the axle-section is to rotate in a reverse direction.

5. In a motor-driven vehicle having an engine-shaft, a main supporting frame, front and rear wheels and a rear axle in sections for said rear wheels, in combination, pairs of sleeves on each axle-section, driving means operable from the engine-shaft for imparting reverse rotary oscillation to the sleeves of each pair thereof, means for alternately engaging the sleeves of each pair with the axle-sections for rotating the same, manually operative means for setting said engaging means to cause the said sleeves to rotate said axle-sections in either direction to vary the direction of movement of the vehicle, and means for varying the movement of said sleeves to vary the speed of the vehicle.

6. In a motor-driven vehicle having an engine-shaft, a main supporting frame, front and rear wheels and a rear axle in sections for said rear wheels, in combination, pairs of sleeves on each axle-section, driving means operable from the engine-shaft for imparting reverse rotary oscillation to the sleeves of each pair thereof, brake-shoes in pairs for each pair of said sleeves and having reversely inclined recesses in their periphery, brake-rollers in said recesses to be engaged by said sleeves on their alternate movements for binding said sleeves, shoes and rear-axle sections together and compelling the rotation of said axle-sections from said sleeves, means for positioning said rollers in said recesses so that some thereof will be operative when the axle sections are to rotate in one direction and others will be operative when the axle-sections are to rotate in a reverse direction, and means for varying the movement of said sleeves to vary the speed of the vehicle.

7. In a motor-driven vehicle having an engine-shaft, a main supporting frame, front and rear wheels and a rear axle in sections for said rear wheels, in combination, pairs of sleeves on each axle-section, driving means operable from the engine-shaft for imparting reverse rotary oscillation to the sleeves of each pair thereof, means for alternately engaging the sleeves of each pair with the axle-sections for rotating the same, manually operative means for setting said engaging means to cause the said sleeves to rotate said axle-sections in either direction to vary the direction of movement of the vehicle, means for varying the movement of said sleeves collectively to vary the speed of the vehicle, and means for separately varying the movement of each pair of said sleeves for securing a differential movement of the axle sections.

8. In a motor-driven vehicle having an engine-shaft, a main supporting frame, front and rear wheels, a rear axle in sections for said rear wheels and a steering rod, in combination, for each axle-section, an oscillatory link having an adjustable saddle, means for oscillating said link from the engine shaft, means for positioning said saddle along said link to vary the speed of the vehicle, oppositely disposed links pivotally connected at their forward ends with said saddle, sleeves on the rear axle-section respectively pivotally connected with the rear ends of said links and adapted for reverse oscillatory rotation therefrom, means for alternately engaging said sleeves with the axle-section for rotating the same, manually operative means for setting said engaging means to cause the movement of said sleeves to rotate said axle-section in either direction to vary the direction of travel of the vehicle, and means for independently adjusting the saddle of each set of driving mechanism for securing a differential rotation of the axle-sections and comprising said steering rod, a Geneva wheel rotatable therefrom carrying two spaced-apart pins and an arcuate rim, cams engaging said rim and recessed to respectively be engaged by said pins for imparting rotation of said cams, crank-arms carried by said cams, rods secured to said crank-arms, and means operable from said rods for positioning said saddles, said wheel acting to lock one of said cams and its crank-arm and rod-stationary when the other rod is operated and also acting to lock said other rod stationary after said rod has performed its movment.

9. In a motor-driven vehicle having an engine-shaft, a main supporting frame, front and rear wheels and a rear-axle in sections for said rear wheels, in combination, pairs of sleeves on each axle-section, driving means operable from the engine-shaft for imparting reverse rotary oscillation to the sleeves of each pair thereof, brake-shoes in pairs for each pair of said sleeves and having reversely inclined recesses in their periphery, brake-rollers in said recesses to be engaged by said sleeves on their alternate movements for binding said sleeves, shoes and rear-axle sections together and compelling the rotation of said axle-sections from said sleeves, means for positioning said rollers in said recesses so that some thereof will be operative when the axle sections are to rotate in one direction and others will be operative when the axle-sections are to rotate in a reverse direction, and means for varying the movement of said sleeves to vary the speed of the vehicle, the means for positioning said rollers comprising spirally grooved sleeve-sections keyed to and slidable on said axle sections, means for sliding said sleeve-sections, and frames on said sleeve-sections having pins extending through said recesses between said rollers and the shallower ends of said recesses and also having pins engaging said spiral grooves, whereby on the shifting of said sleeve-sections said grooves by engaging said last-mentioned pins will effect the rotary movement of said frames to carry their first-mentioned pins against said brake-rollers for positioning the same in their recesses.

Signed at New York city, in the county of New York and State of New York, this 21st day of July, A. D. 1920.

SEYED KHALIL.